United States Patent [19]

Wolos

[11] 4,014,052
[45] Mar. 29, 1977

[54] APPARATUS FOR MAINTAINING A PREDETERMINED LIQUID LEVEL

[75] Inventor: Keith H. Wolos, Pequannock, N.J.

[73] Assignee: Meridian Industries, Inc., Pompton Plains, N.J.

[22] Filed: Feb. 26, 1976

[21] Appl. No.: 661,799

[52] U.S. Cl. .................................. 4/172; 4/172.15; 4/172.17; 15/1.7; 137/562; 137/563
[51] Int. Cl.[2] ...................... E04H 3/16; E04H 3/18; F16L 22/02
[58] Field of Search ............ 4/172, 172.15, 172.17, 4/172.18; 15/1.7; 137/562, 563

[56] References Cited
UNITED STATES PATENTS

| 1,820,981 | 9/1931 | Fever | 4/172.17 X |
| 2,739,939 | 3/1956 | Leslie | 4/172.17 X |
| 3,304,564 | 2/1967 | Green et al. | 15/1.7 |
| 3,759,286 | 9/1973 | Page | 4/172.17 X |

Primary Examiner—Henry K. Artis

[57] ABSTRACT

An apparatus for maintaining a predetermined liquid level within a tank while effecting the continuous addition and removal of liquid within the tank. The apparatus is provided with a housing that mounts directly on a side wall of the tank with the housing extending on both sides of the wall, so that it is partially inside and partially outside the tank. The housing has a first passageway which receives fresh liquid from a pressurized supply and introduces a portion of the fresh liquid into the tank. The remainder of the fresh liquid is provided to a second passageway which is connected between the first passageway and a drain. The second passageway has a constriction near its inlet, which accelerates liquid flowing through it and injects the liquid into the second passageway at a high speed. This produces a region of low pressure in the second passageway. A third passageway is connected to the region of low pressure and it is coupled to the water in the tank. By this arrangement, the low pressure is coupled to the third passageway, and is expelled to the drain. In one embodiment, the apparatus includes a mechanism for fail-safe operation in the event of excessive supply pressure build up.

16 Claims, 4 Drawing Figures

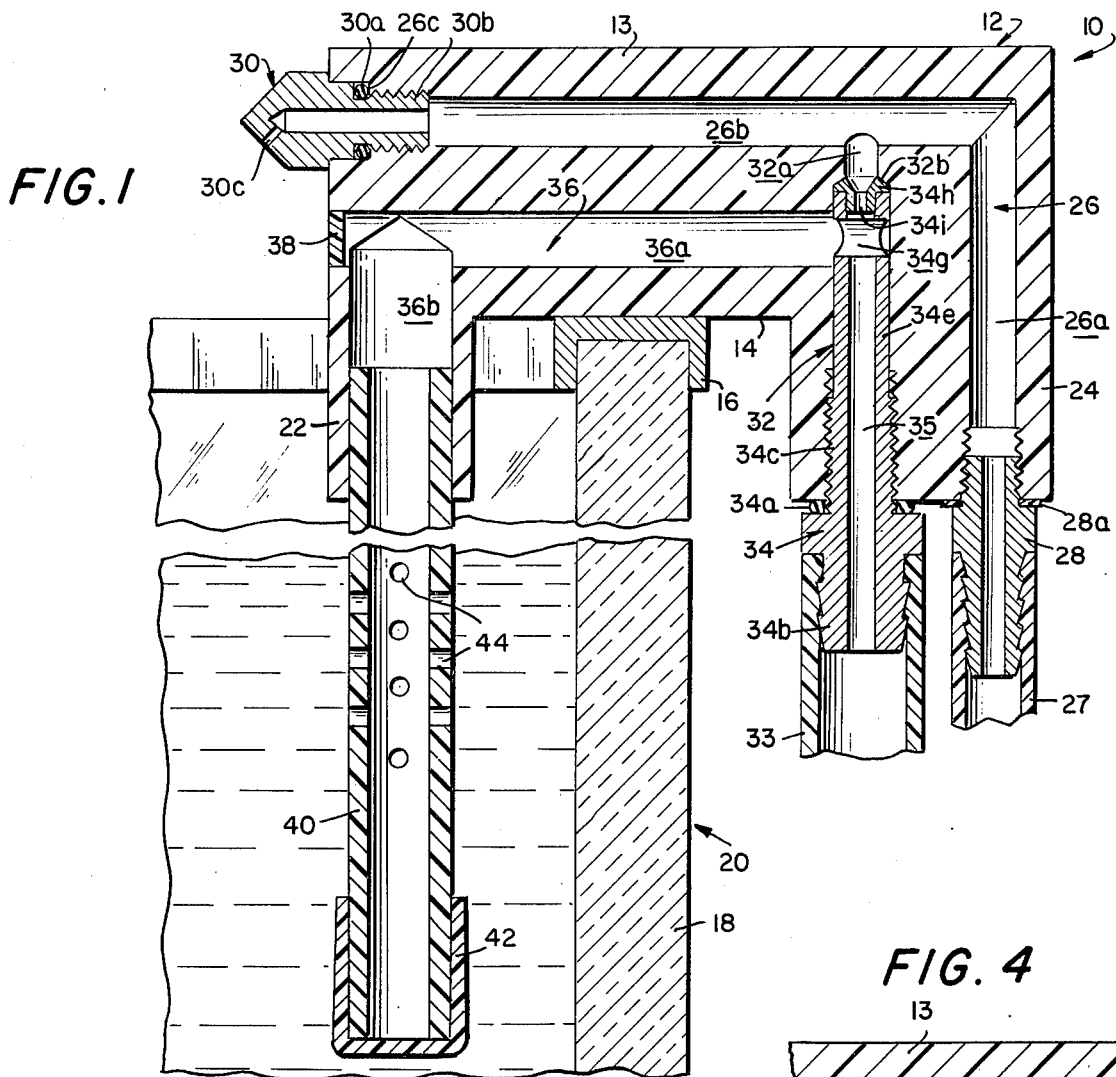
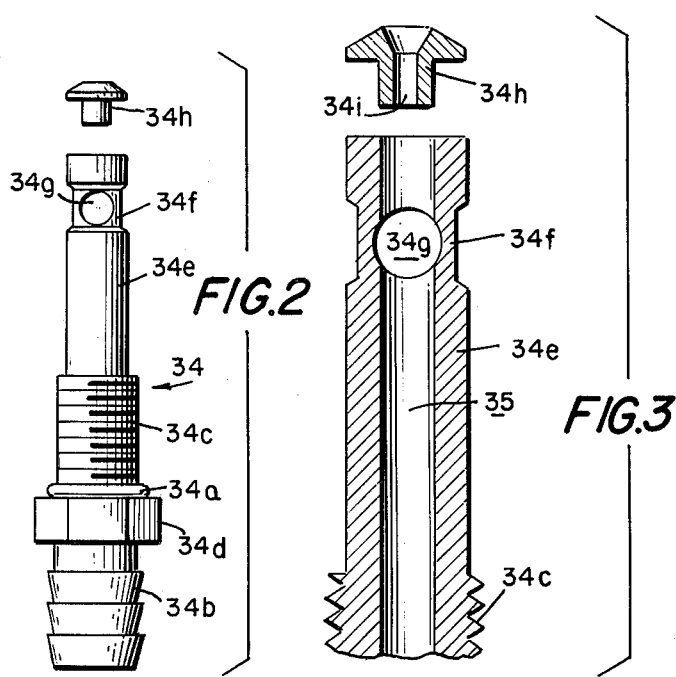
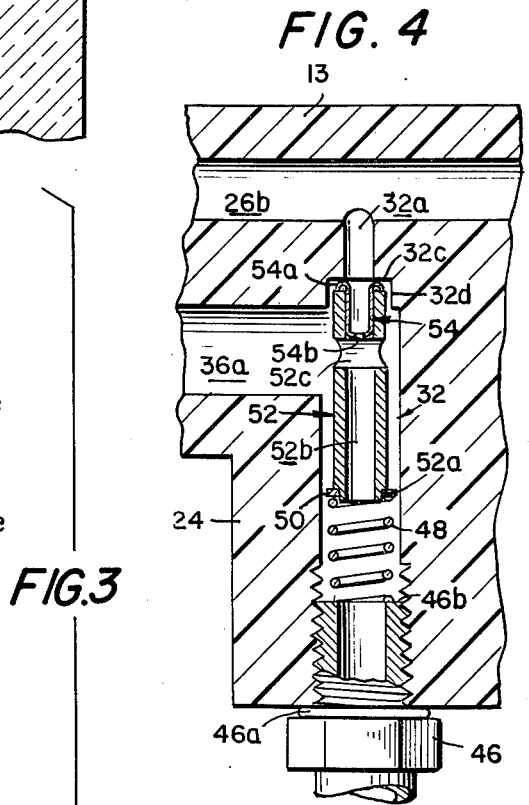

APPARATUS FOR MAINTAINING A PREDETERMINED LIQUID LEVEL

The present invention relates generally to fluid circulation systems, and more particularly, to apparatus for maintaining a predetermined liquid level within a tank while continuously adding and removing liquid within the tank.

Apparatus are known to the art which have no moving parts, but rather, utilize water pressure to maintain the cleanliness and level of a body of water in a tank. For example, U.S. Pat. No. 3,304,564, issued to J. Green, et al., on Feb. 21, 1967, discloses such an apparatus which includes first and second tubular sections in end-to-end axial alignment. The inlet of the first section is connected to a pressurized source or water supply and the first section receives one end of a conduit, the other end of which is disposed near the bottom of a tank partially filled with water. Also, the first section tapers to form a nozzle which extends into the inlet of the second section. In the vicinity of its inlet, the second section receives one end of a conduit, the other end of which extends into the water in the tank. In operation, the conduit in the first section receives some of the water therefrom and delivers it to the tank at a point below the water level of the tank. The remainder of the water received at the inlet of the first section is injected through the nozzle into the inlet of the second section as a high speed stream and creates a region of low pressure there. Owing to this pressure the conduit connected to the outlet section draws water from the tank into the outlet section and thereby maintains th level of water in the tank.

Although apparatus are in existence for maintaining the cleanliness and level of a body of liquid in a tank, such apparatus do not possess certain characteristics desirable in such devices. For example, it would be convenient to mount such an apparatus directly on the tank, but with existing devices, this is either impossible or can be accomplished only by using additional equipment. Furthermore, in certain applications, such as in aquarium where fish must extract oxygen from the water, it is desirable to have aerated liquid in the tank. With existing devices, which provide fresh liquid from a pressurized source to a point below the level of liquid in the tank, aeration can only be pumping by pumpin air through the liquid in the tank. It would be more desirable to provide fresh previously-aerated liquid. Also, it is desirable that this type of apparatus include a mechanism to reduce internal pressures when the water supply pressure becomes excessive. This avoids unnecessary breakdowns of the device and avoids the possibility of injury to users. Moreover, apparatus of the type being discussed should achieve the overall objectives of dependability under continuous use, simplicity of design and economy of construction.

Broadly, it is an object of the present invention to provide an apparatus for maintaining a predetermined level of liquid in a tank while achieving a continuous renewal of the liquid, which apparatus realizes one or more of the aforesaid objectives. Specifically, it is within the contemplation of the present invention to provide such an apparatus which is constructed to mount directly on the tank. It is a further object of this invention to provide an apparatus for maintaining a predetermined liquid level in a tank while achieving a continuous renewal of the liquid, in which apparatus internal pressures are reduced to a safe level when the liquid supply pressure is excessive.

It is another object of the present invention to provide an apparatus for maintaining a predetermined liquid level in a tank while achieving a continuous renewal of liquid in which apparatus internal pressures are reduced to a safe level when the liquid supply pressure is excessive.

It is yet another object of the present invention to provide an apparatus for maintaining a predetermined liquid level in a tank while achieving a continuous renewal of the liquid which apparatus satisfies the practical requirements for such equipment including dependability under continuous use, simplicity of design and economy of construction.

In accordance with an illustrative embodiment demonstrating objects and features of the present invention, there is provided an apparatus for maintaining a predetermined level of liquid in a tank while replacing the liquid with fresh liquid from a pressurized supply or source. The apparatus includes a housing having a center section and a pair of lateral sections depending therefrom. The housing is adapted to be mounted on one of the upstanding side walls of the tank with the lateral sections extending downwardly and straddling the side wall such that a first of the lateral sections is suspended inside the tank and a second of the lateral sections is suspended outside the tank. A first liquid passageway in the housing has a supply inlet in the second lateral section which is adapted to be connected to the pressurized liquid supply and a supply outlet which is adapted to be positioned above the level of the liquid in the tank. The supply outlet is provided with a nozzle for spraying fresh liquid into the tank so that the liquid supplied to the tank is aerated. A second passageway in the housing has a drain inlet connected to the first passageway and a drain outlet, in the second lateral section, adapted to be connected to an external drain. Near its drain inlet, the second passageway includes a constriction or region of reduced cross-section. A third passageway is formed in the housing with a liquid inlet, in the first lateral section, which is adapted to be coupled to the liquid in the tank, and includes a liquid outlet coupled to the second passageway. In operation a portion of the liquid supplied to the first passageway flows to the supply outlet thereof and is sprayed into the tank via the nozzle. The remainder of the liquid supplied to the first passageway flows into the second passageway and is accelerated in flowing through the constriction to create a high speed stream or jet of liquid. This high speed stream is injected into the second passageway from the constriction and produces a suction or reduced pressure in the second passageway. As a result of the suction, liquid from the tank is drawn into the third passageway, to the second passageway and is expelled from the drain outlet of the second passageway. By the above arrangement, the level of liquid in the tank is controlled by continuously extracting liquid while fresh liquid is being sprayed into the tank.

The above brief description, as well as further objects, features and advantages of the present invention will be more fully appreciated by reference to the following detailed description of presently preferred, but nonetheless illustrative, embodiments in accordance with the invention, when taken in conjunction with the accompanying drawing wherein:

FIG. 1 is a sectional view, partially broken away, of an apparatus, constructed in accordance with the present invention, which is mounted on the wall of a liquid-containing tank for maintaining a predetermined liquid level in the tank while achieving a continuous renewal of the liquid in the tank;

FIG. 2 is an exploded side view of part of the second fluid passageway in the apparatus showing the components for producing a region of low pressure in the second passageway;

FIG. 3 is an enlarged sectional view of the upper portion of the components shown in FIG. 2 showing details of internal construction; and FIG. 4 is an enlarged, view of the second fluid passageway showing a modified construction for producing a region of low pressure while providing for pressure release in the event of an excessive build-up of liquid pressure in the apparatus.

Referring to FIG. 1, there is shown an apparatus 10, embodying objects and features of the present invention, which is mounted on an aquarium 20 for maintaining the level and cleanliness of the water 25 therein. The apparatus 10 includes a housing 12, made of any sturdy material, for example, plexiglass. The housing is generally U-shaped to permit direct mounting on a side wall of the aquarium and includes a center section 13, and lateral sections 22 and 24 forming the arms of the U-shape. For mounting the apparatus, center section 13 has a surface 14 which is conveniently rested on the rim 16 of the upstanding side wall 18 of aquarium 20 to support the apparatus 10 in its operative position with lateral housing sections 22 and 24 straddling the wall 18 and extending inside and outside the aquarium, respectively. In this position, water from a pressurized supply or source, for example, a water faucet, is admitted to the apparatus 10 via hose 27 and is sprayed into the aquarium from a nozzle 30 in housing 12. Also, water from the aquarium 20 is drawn into tube 40 in lateral section 22 and is discarded via hose 33 as will be more fully explained hereinafter.

Housing 12 includes a number of passageways which form part of the operative structure of apparatus 10. A first passageway 26, having a supply inlet, adapted to receive water from the pressurized supply (not shown) via hose 27, extends upward in lateral section 24, across section 13 and terminates in a supply outlet adapted to receive nozzle 30. A second passageway 32, having a drain inlet connected to passageway 26, extends downwardly in lateral section 24 and terminates in a drain outlet adapted to receive an assembly 34, which is coupled to the drain (not shown) via hose 33. The assembly 34 includes an internal passageway 35, a channel 34g coupling passageway 35 to passageway 32, and a constriction 34i. A third passageway 36 in the housing having a liquid inlet which receives tube 40, extends upward in lateral section 22, across section 13 and terminates in a liquid outlet which is connected to passageway 32. The tube 40, having apertures 44, is mounted inside passageway 36 and extends downward into the water 25 in aquarium 20.

In operation, supply water provided to the supply inlet of passageway 26, is shared between nozzle 30 and the drain inlet of passageway 32. The water provided to nozzle 30 is sprayed into aquarium 20. The water provided to passageway 32 flows into constriction 34i and is thereby accelerated to be injected across channel 34g and into passageway 35 as a high speed water jet. The injection of this water jet creates a region of low pressure or suction in channel 34g and passageway 35, and the suction is transmitted in to channel 36. As a result, water is drawn, via apertures 44, up tube 40, into passageways 36 and 35, and is ultimately expelled via hose 33. It will be appreciated that, should the water level drop below the uppermost of apertures 44, apparatus 10 will draw air instead of water and will not resume withdrawing water from aquarium 20 until all of apertures 44 are submerged. Through the described arrangement, the water level in aquarium 20 is maintained generally above the uppermost of apertures 44 while the water is continuously replenished In constructing apparatus 10 passageway 26 is formed, for example, by boring upwardly in lateral section 24 to produce a channel 26a. The open end of channel 26a, corresponding to the supply inlet of passageway 26, is threaded to accept a conventional hose fitting 28, which is secured in the supply inlet over a seal 28a to prevent leakage around the fitting. Fitting 28 receives a hose 27 which is coupled to the pressurized water supply. The open end of channel 26b, which corresponds to the supply outlet of passageway 26, is adapted to receive a threaded nozzle. For this purpose, the opening of channel 26b is widened to form a recessed seat 26c for a sealing ring 30a, and a portion of channel 26b to the right of seat 26c (in FIG. 1) is threaded to receive the threaded portion 30b of nozzle 30. When nozzle 30 is secured to housing 12 by being fastened into the end of channel 26b, seal 30a firmly engages seat 26c to prevent leakage around nozzle 30. With nozzle 30 in its operative position, a downwardly directed aperture 30c at the end of the nozzle sprays water received from the pressurized source into aquarium 20. It will be appreciated that this sprayed water is aerated in passing through the air and that the splashing of this water onto the surface of the water in the aquarium produces further aeration.

Passageway 32 is formed, for example, by boring upwardly in lateral section 24, i.e. alongside channel 26a and, generally, parallel thereto, until channel 26b is intersected. Except for a short upper or inlet section 32a which has a reduced diameter, passageway 32 is of uniform diameter throughout its length. Passageway 32 has a bevel 32b where section 32a joins the remainder of passageway 32. This bevel engages the top of assembly 34 which is received in passageway 32 and which will be described more fully hereinafter. The lower end or drain outlet of passageway 32 is threaded to permit fastening of assembly 34 within housing 12. A seal 34a, disposed between housing 12 and the portion of assembly 34 external to housing 12, is firmly seated when assembly 34 is fastened within housing 12 and, thus, prevents leakage between housing 12 and assembly 34. The bottom portion of assembly 34 is a conventional hose fitting 34b and receives hose 33 which is connected to the drain A third fluid passageway 36 is formed, for example, by boring channel 36a alongside channel 26b and, generally, parallel thereto until passgeway 32 is intersected. Plug 38 is secured in the open end of channel 36a to close it. Passageway 36b is bored upwardly in lateral section 22 and, generally, at a right angle to channel 36a is intersected. The bottom of channel 36b, corresponding to the liquid inlet of passageway 36 receives plastice tube or pipe 40. The upper end of pipe 40 is retained in passageway 36 as a result of an interference fit between channel 36b and pipe 40. This interference fit is only moderate, so pipe 40 can be moved within channel 36b to adjust the depth to which pipe 40 is submerged in water 25. A cap 42 is fitted over the lower end of pipe 40 to close it off, and perforations 44 in the periphery of pipe 40 permit water from aquarium 20 to enter into the pipe without simultaneously admitting particles large enough to clog the internal passageways of apparatus 10.

Assembly 34 is preferably made of a metal, for example, brass. As best seen in FIG. 2, assembly 34 has a hose fitting 34b at its lower end and includes: a threaded portion 34c and a hexagonal head 34d, which permit assembly 34 to be secured in housing 12; a seal 34a, which is compressed between hexagonal head 34d and housing 12 when assembly 34 is secured; and a stem portion 34e and housing 12 when assembly 34 is secured; and a stem portion 34e, which extends above threaded portion 34c. Extending within the assembly 34 is a liquid passageway 35 (see FIG. 1). Stem portion 34e has a section 34f of reduced outside diameter which has a channel 34g drilled through it at a right angle to passageway 35 to permit communication between passageways 35 and 32. It will be appreciated that since stem portion 34e is essentially a hollow tube, water in passageway 32 actually flows in passageway 35.

A removable orifice insert 34h, having a constriction 34i is seated on top of stem 34e with constriction 34i extending into channel 35. A bevel on top of orifice insert 34h firmly engages bevel 32b when assembly 34 is fully assembled into housing 12. In this assembled position (FIG. 1), passageway 35 communicates with passageway 36 via channel 34g and with passageway 36 via orifice insert 34h and inlet portion 32a of passageway 32.

FIG. 4 illustrates how apparatus 10 can be modified to yield a second embodiment which provides fail-safe operation in the event that the water supply builds up excessive pressure. Under these circumstances, normal operation ceases and fresh water is passed directly to channel 32 and therefrom to the drain. This avoids bursting connecting hoses or damaging the apparatus 10. Inasmuch as only passageway 32 and devices included therein need be modified only this part of apparatus 10 is shown in FIG. 4.

Broadly, the modification involves mounting the orifice insert 54 for movement along channel 32 and retaining it in its normal position coupled to the drain inlet of passageway 32 by means of the pressure of a spring 48, or the like. As a result, when water pressure builds up enough to overcome the spring pressure, the orifice insert is moved downward (in FIG. 4) and pressure relief is provided by the passage of water around orifice insert 54, into channel 32 and therefrom to the drain.

The upper part of passageway 32 is modified to have a square shoulder 32c instead of the bevel 32b of FIG. 1, and the elements providing pressure relief are mounted between shoulder 32c and the substantially flat top 46b of a conventional hose fitting 46, which is secured in passageway 32 over a seal 46a to prevent leakage around fitting 46. A coil spring 48 made, for example, of brass sits on the top edge 46b of fitting 46. Spring 48 is ground flat on the bottom so that the spring rests on edge 46b in a generally vertical position. Also, the top of spring 48 is ground flat so that it lies in a plane generally parallel to edge 46b. Thus, washer 50 which is rested on top of spring 48 is supported in a generally parallel position to edge 46b. The outside diameter of washer 50 is selected to provide a loose fit inside passageway 32.

A hollow tube, indicated generally as 52, is placed on washer 50. The outside diameter of tube 52 is selected to provide substantial clearance in passageway 32 while providing free movement in narrowed portion 32d of channel 32. Also, the outside diameter of tube 52 is larger than the hole in washer, but the tube is provided with an under-cut 52a at its lower end to allow tube 52 to fit snugly in the hole of washer 50. The inside of tube 52 includes a channel 52b extending its entire length, and a channel 52c is provided at a right angle to channel 52b to provide communication between channel 52b and passageways 32 and 36.

Orifice insert 54 is a cylindrical shell made, for example, of brass, and is mounted in the upper end of channel 52b. Insert 54 is flared outwardly at its top to form a curved rim 54a which serves not only to support insert 54 in channel 52b, but also engages shoulder 32c to form a seal that prevents water in inlet portion 32a of passageway 32 from leaking around tube 52. The bottom of insert 54 is closed except for a small opening or construction 54b.

When water pressure is normal, the embodiment of FIG. 4 operates identically to the embodiment of FIG. 1. Fresh water from passageway 26 is sprayed into aquarium 20 and is also provided to inlet portion 32a of passageway 32. With normal pressure, the force of spring 48 provides an effective seal between rim 54a and shoulder 32c so that water from portion 32a of passageway 32 must flow through constriction 54b. This water is injected as a high speed jet across channel 52c and into channel 52b. As previously explained, such an injection creates a suction in channels 52b and 52c, and this suction is used to withdraw water from aquarium 20. As the water pressure increases, the pressure inside insert 54 rises proportionately. In particular, the downward component of pressure acts to force insert 54 downward against the force of spring 48. When the pressure is high enough to overcome the force of spring 48, insert 54 moves downward and water begins to flow between rim 54a and shoulder 32c. Thus, water flows out of apparatus 10 via passageway 32 and fitting 46, after flowing through channels 52c and 52b, or after leaking past washer 50. This increased flow of water in passageway 32 not ony reduces the pressure inside apparatus 10, but also reduces the amount of water withdrawn from aquarium 20, since most of the water in passageway 32 is now provided by the increased flow from inlet portion 32a of channel 32 the chances of the aquarium being flooded are minimized, since the delivery of water to the aquarium is also reduced as a result of more water being diverted to passageway 32 from passageway 26. When water pressure returns to normal, spring 48 forces rim 54a against shoulder 32c to restore the seal, and normal operation resumes. It wll be appreciated that the water pressure at which rim 54a and shoulder 32c separate can be predetermined by selecting the tension of spring 48.

It should be noted that tube 52 need not be provided with a separate orifice insert 54 as in the embodiment of FIG. 4. The removable orifice insert 54 was provided as a convenience to permit ready replacement of the orifice insert in the event that an insert with a different size constriction is desired, or in the event that rim 54a is damaged and fails to provide a good seal with shoulder 32c.

Although specific embodiments of the invention have been described for illustrative purposes, it will be realized by one skilled in the art that many modifications, additions, and substitutions are possible without departing from the scope and spirit of the invention. For example, assembly 34 of FIG. 1 is merely a convenient means for retaining orifice insert 34h near the inlet to passageway 32 so that constriction 34i can produce a suction. The orifice insert could be retained by any other means such as by being glued or press-fitted in passageway 32. Alternately, the constriction could be formed directly as part of passageway 32.

What is claimed is:

1. An apparatus adapted to be mounted on a liquid-containing tank having at least one upstanding wall and constructed to control the level of the liquid contained in said tank by providing fresh liquid from an external pressurized source and expelling liquid from said tank to an external drain comprising a housing having a supporting wall adapted to rest on and straddle said upstanding wall with a first portion of said housing extending over the surface of the liquid in said tank and a second portion of said housing extending outwardly of said upstanding wall, a first liquid passageway formed in said housing having a supply inlet in said second housing portion adapted to be coupled to a source of pressurized liquid and a supply outlet in said first housing portion adapted to emit liquid into said tank from a position above the level of the liquid in said tank, a second liquid passageway formed in said housing having a drain inlet connected to said first liquid passageway and a drain outlet in said second housing portion arranged to be coupled to said drain, means in said second liquid passageway for restricting the flow of liquid from said first passageway to said second passageway, and a third liquid passageway in said housing having a liquid inlet in said first housing portion adapted to be coupled to the liquid in said tank and a liquid outlet coupled to the second liquid passageway, so that as liquid from said pressurized source flows from said supply inlet toward said supply outlet of said first passageway a portion of said liquid is diverted to flow through said restricting means and said second passageway, creating a region of reduced pressure in said second passageway whereby liquid from said tank is drawn through said third liquid passageway to said region of reduced pressure and is expelled from said second liquid passageway through said drain outlet.

2. The apparatus according to claim 1 wherein said means for restricting the flow of liquid into said second passageway includes a constricted section in said second passageway disposed between said drain inlet of said second passageway and said liquid outlet of said third passageway, at least a portion of the liquid which passes through said first passageway flowing into said drain inlet of said second passageway and through said constricted section wherein the liquid flow is accelerated so that the liquid is injected into said second passageway at high speed thereby creating said region of reduced pressure.

3. The apparatus of claim 1 wherein said means for restricting the flow of liquid in said second passageway includes an orifice insert adapted to be mounted in said second passageway, said orifice insert including a constricted channel for accelerating liquid passing therethrough to create said region of reduced pressure, and means for mounting said orifice insert in said second passageway with said orifice insert coupled to said drain inlet of said second passageway.

4. The apparatus of claim 3 wherein said orifice insert mounting means includes a tubular member mounted in said second passageway and adapted to engage said orifice insert for retaining said orifice insert in its mounted position, said tubular member having an aperture positioned to communicate with said third passageway.

5. The apparatus of claim 3 wherein said orifice insert mounting means includes resilient means for providing pressure to retain said orifice insert in its mounted position, said resilient means yielding when the liquid pressure in said orifice insert exceeds a predetermined value to move said orifice insert from its mounted position so that liquid leaks around said orifice insert into said second passageway thereby reducing said liquid pressure.

6. In combination, a liquid containing tank having a bottom wall and at least one upstanding side wall and an apparatus for controlling the level of a liquid contained in said tank by providing fresh liquid to said tank from an external pressurized source and expelling liquid from said tank to an external drain, said apparatus comprising a housing including a center section forming the base thereof and first and second lateral sections joined to said base, said housing being mounted on said tank with said center section resting on one of said side walls and said first and second lateral sections extending inside and outside said tank, respectively, a first liquid passageway formed in said housing having a supply inlet in said second lateral section adapted to be coupled to said pressurized source and a supply outlet positioned above the level of the liquid in said tank, said first liquid passageway providing fresh liquid from said pressurized source to said tank, a second liquid passageway formed in said housing having a drain inlet connected to said first liquid passageway and a drain outlet in said second lateral section coupled to said drain, means in said second liquid passageway for restricting the flow of liquid from said first liquid passageway into said second liquid passageway, and a third liquid passageway formed in said housing having a liquid inlet in said first lateral section coupled to the liquid in said tank and a liquid outlet coupled to said second liquid passageway, so that as liquid from said pressurized source flows from said supply inlet toward said supply outlet of said first passageway a portion of said liquid is diverted to flow through said restricting means and said second passageway, creating a region of reduced pressure in said second passageway whereby liquid from said tank is drawn through said third liquid passageway to said region of reduced pressure and is expelled from said second liquid passageway through said drain outlet.

7. The apparatus according to claim 6 wherein said means for restricting the flow of liquid into said second passageway includes a constricted section in said second passageway disposed between said drain inlet of said second passageway and the outlet of said third passageway, at least a portion of the liquid which passes through said first passageway flowing into said drain inlet of said second passageway and through said constricted section wherein the liquid flow is accelerated, so that the liquid is injected into said second passageway at high speed, thereby creating said region of reduced pressure.

8. The apparatus of claim 6 wherein said means for restricting the flow of liquid in said second passageway includes an orifice insert adapted to be mounted in said second passageway, said orifice insert including a constricted channel for accelerating liquid passing therethrough to create said region of reduced pressure, and means for mounting said orifice insert in said second passageway with said orifice insert coupled to said drain inlet of said second passageway.

9. The apparatus of claim 8 wherein said orifice insert mounting means includes a tubular member mounted in said second passageway and adapted to engage said orifice insert for retaining said orifice insert in its mounted position, said tubular member having an aperture positioned to communicate with said third passageway.

10. The apparatus of claim 8 wherein said orifice insert mounting means includes resilient means for providing pressure to retain said orifice insert in its mounted positioned, said resilient means yielding when the liquid pressure in said orifice insert exceeds a predetermined value to move said orifice insert from its mounted position so that liquid leaks around said orifice insert into said second passageway thereby reducing said liquid pressure.

11. An improved apparatus for controlling the liquid level of a body of liquid by expelling liquid from said body of liquid to an external drain and replacing the expelled liquid with fresh liquid from an external pressurized source, said apparatus including a housing, a supply inlet in said housing for receiving fresh liquid from said pressurized source, liquid supply means coupled to said supply inlet for delivering a portion of the fresh liquid from said supply inlet to said body of liquid, a liquid passageway formed in said housing having a drain inlet coupled to said supply inlet for receiving the remainder of the fresh liquid and a drain outlet coupled to said external drain, and means coupling said liquid passageway to said body of liquid, wherein the improvement comprises pressure relief means mounted in said liquid passageway and responsive to excessive pressure at said drain inlet, said pressure relief means including liquid flow restricting means and resilient means responsive to liquid pressure at said drain inlet for retaining said liquid flow restricting means in a first position to restrict the flow of liquid into said liquid passageway when liquid pressure is below a predetermined value and for moving said liquid flow restricting means to a second position when liquid pressure exceeds a predetermined value to reduce liquid pressure at said drain inlet.

12. The improved apparatus according to claim 11 wherein said liquid flow restricting means includes a constricted channel so that liquid which is received in said drain inlet when said liquid flow restricting means is in said first position flows through said constricted channel wherein the liquid flow is accelerated thereby creating a region of reduced pressure in said liquid passageway.

13. The apparatus of claim 12 wherein said liquid flow restricting means includes a detachable orifice insert having said constricted channel formed therein.

14. The apparatus of claim 11 wherein said pressure relief means further includes sealing means mounted between said liquid flow restricting means and said drain inlet for preventing leakage of liquid into the liquid passageway when said liquid flow restricting means is in its first position in sealing engagement with said drain inlet, liquid pressure in excess of the predetermined value being effective to move said liquid flow restricting means out of sealing engagement with said drain inlet permitting liquid to flow into said liquid passageway whereby said liquid pressure is reduced.

15. The apparatus of claim 11 wherein said resilient means includes a coil spring constructed and arranged to oppose liquid pressure at said drain inlet.

16. The apparatus of claim 11 wherein said liquid flow restricting means includes an orifice insert having a constricted channel therein and a tubular member having an inlet end adapted to receive and hold said orifice insert and an outlet and communicating with said liquid passageway, said resilient means including a coil spring engaging said tubular member and mounted in said liquid passageway to urge said orifice insert into engagement with said drain inlet.

* * * * *